United States Patent
Lim et al.

(10) Patent No.: US 10,404,314 B2
(45) Date of Patent: Sep. 3, 2019

(54) METHOD FOR TRANSMITTING AND RECEIVING SIGNAL BY AGGREGATING THREE DOWNLINK CARRIERS AND TWO UPLINK CARRIERS

(71) Applicant: LG ELECTRONICS INC., Seoul (KR)

(72) Inventors: Suhwan Lim, Seoul (KR); Sangwook Lee, Seoul (KR); Seungpyo Noh, Seoul (KR); Dongik Lee, Seoul (KR); Youngryoul Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 205 days.

(21) Appl. No.: 15/238,548

(22) Filed: Aug. 16, 2016

(65) Prior Publication Data

US 2017/0054535 A1   Feb. 23, 2017

Related U.S. Application Data

(60) Provisional application No. 62/205,755, filed on Aug. 17, 2015.

(30) Foreign Application Priority Data

Aug. 10, 2016 (KR) .......................... 10-2016-0101540

(51) Int. Cl.
| | |
|---|---|
| *H04B 1/525* | (2015.01) |
| *H04L 5/00* | (2006.01) |
| *H04L 27/00* | (2006.01) |
| *H04W 28/02* | (2009.01) |
| *H04L 27/26* | (2006.01) |
| *H04W 72/04* | (2009.01) |

(Continued)

(52) U.S. Cl.
CPC .......... *H04B 1/525* (2013.01); *H04J 11/0023* (2013.01); *H04L 5/001* (2013.01); *H04L 5/0037* (2013.01); *H04L 5/0066* (2013.01); *H04L 5/1461* (2013.01); *H04L 27/0006* (2013.01); *H04L 27/2646* (2013.01); *H04W 28/0236* (2013.01); *H04W 72/0453* (2013.01)

(58) Field of Classification Search
CPC ..... H04L 5/00; H04L 5/0037; H04L 27/0006; H04L 27/2646; H04J 11/0023; H04W 72/0453; H04W 28/0236
See application file for complete search history.

(56) References Cited

U.S. PATENT DOCUMENTS

| | | | | |
|---|---|---|---|---|
| 2012/0075989 A1* | 3/2012 | Roessel | ................. | H04W 72/04 370/230 |
| 2012/0322455 A1* | 12/2012 | Oh | ...................... | H04W 72/048 455/450 |

OTHER PUBLICATIONS

Maximum sensitivity degradation for various bands, Ericsson, Nov. 2008.*

(Continued)

*Primary Examiner* — Omer S Mian
(74) *Attorney, Agent, or Firm* — Birch, Stewart, Kolasch & Birch, LLP

(57) ABSTRACT

When a terminal aggregates three downlink carriers by using the carrier aggregation (CA) of the LTE-A technology and transmits an uplink signal on two uplink carriers while aggregating two uplink carriers, a harmonic component and an intermodulation distortion (IMD) component are generated, thereby influencing a downlink band of the terminal itself. Therefore, the present specification presents a scheme therefor.

14 Claims, 14 Drawing Sheets

(51) Int. Cl.
*H04J 11/00* (2006.01)
*H04L 5/14* (2006.01)

(56) References Cited

OTHER PUBLICATIONS

3GPP, "LTE; Evolved Universal Terrestrial Radio Access (E-UTRA); User Equipment (UE) radio transmission and reception (3GPP TS 36.101 version 12.5.0 Release 12)", 2014, IEEE.*

* cited by examiner

METHOD FOR TRANSMITTING AND RECEIVING SIGNAL BY AGGREGATING THREE DOWNLINK CARRIERS AND TWO UPLINK CARRIERS

CROSS-REFERENCE TO RELATED APPLICATIONS

This application claims the benefit of priority of U.S. Provisional Application No. 62/205,755 filed on Aug. 17, 2015 and the benefit of priority of Korean Patent Application No. 10-2016-0101540 filed on Aug. 10, 2016, all of which are incorporated by reference in their entirety herein.

BACKGROUND OF THE INVENTION

Field of the Invention
The present invention relates to mobile communication.
Discussion of the Related Art
$3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Development of 3GPP LTE-Advanced (LTE-A) which is an evolution of the 3GPP LTE has been completed in recent years. According to the LTE-A, a carrier aggregation (CA) technology is presented, which aggregates and uses multiple bands into one.

A frequency which can be used for LTE/LTE-A, that is, a carrier is defined in 3GPP by considering radio wave situations of various countries.

Meanwhile, when a terminal aggregates three downlink carriers by using the carrier aggregation (CA) of the LTE-A technology and transmits an uplink signal on two uplink carriers while aggregating two uplink carriers, a harmonic component and an intermodulation distortion (IMD) component are generated, thereby influencing a downlink band of the terminal itself.

SUMMARY OF THE INVENTION

Accordingly, a disclosure of the present specification has been made in an effort to solve the aforementioned problem.

In accordance with an embodiment of the present invention, provided is a method for transmitting/receiving a signal in carrier aggregation. The method may include transmitting an uplink signal by using two uplink carriers when three downlink carriers and two uplink carriers are configured to be aggregated. Herein, the uplink carriers may include three operating bands of evolved universal terrestrial radio access (E-UTRA) operating bands 1, 3, 5, 7, and 20 and the uplink carriers may include two operating bands The method may include receiving a downlink signal through all of three downlink carriers. Herein, when a center frequency of a first uplink carrier among the uplink carriers corresponds to a first value and the center frequency of a second uplink carrier corresponds to a second value, in the case where the center frequency of a third downlink carrier among the downlink carriers belongs to a third value, predetermined maximum sensitivity degradation (MSD) is applied to receiving reference sensitivity of the downlink signal, thereby successfully receiving the signal.

When three downlink carriers are E-UTRA bands 1, 5, and 7 and two uplink carriers are E-UTRA bands 1 and 7 and when the center frequency of the first uplink carrier corresponds to 1,968 MHz, the center frequency of the second uplink carrier corresponds to 2,512 MHz, and the center frequency of the third uplink carrier corresponds to 880 MHz, the MSD value may be 0.22 or 0 dB.

Herein, when the number of resource blocks (RBs) of the first uplink carrier is 25 and the number of resource blocks (RBs) of the second uplink carrier is 50, the MSD value in a third downlink band may be 0.22 or 0 dB.

When three downlink carriers are E-UTRA bands 3, 5, and 7 and two uplink carriers are E-UTRA bands 3 and 7 and when the center frequency of the first uplink carrier corresponds to 1,737 MHz, the center frequency of the second uplink carrier corresponds to 2,543 MHz, and the center frequency of the third uplink carrier corresponds to 806 MHz, the MSD value may be 22 dB.

Herein, when the number of resource blocks (RBs) of the first uplink carrier is 25 and the number of resource blocks (RBs) of the second uplink carrier is 50, the MSD value in the third downlink band may be 22 dB.

When three downlink carriers are E-UTRA bands 3, 5, and 7 and two uplink carriers are E-UTRA bands 3 and 20 and when the center frequency of the first uplink carrier corresponds to 1,775 MHz, the center frequency of the second uplink carrier corresponds to 885 MHz, and the center frequency of the third uplink carrier corresponds to 2,630 MHz, the MSD value may be 23 dB.

Herein, when the number of resource blocks (RBs) of the first uplink carrier is 50 and the number of resource blocks (RBs) of the second uplink carrier is 25, the MSD value may be 23 dB.

In accordance with another embodiment of the present invention, provided is a terminal for transmitting/receiving a signal in carrier aggregation. The terminal may include a transmitting unit transmitting an uplink signal by using two uplink carriers when three downlink carriers and two uplink carriers are configured to be aggregated. Herein, the uplink carriers may include three operating bands of evolved universal terrestrial radio access (E-UTRA) operating bands 1, 3, 5, 7, and 20 and the uplink carriers may include two operating bands The terminal may include a receiving unit receiving a downlink signal through all of three downlink carriers. The terminal may include a processing successfully receiving the signal by predetermined maximum sensitivity degradation (MSD) to receiving reference sensitivity of the downlink signal in the case where the center frequency of a third downlink carrier among the downlink carriers belongs to a third value when a center frequency of a first uplink carrier among the uplink carriers corresponds to a first value and the center frequency of a second uplink carrier corresponds to a second value.

According to a disclosure of the present invention, the above problem of the related art is solved.

DETAILED DESCRIPTION OF THE EMBODIMENTS

Figure 1:
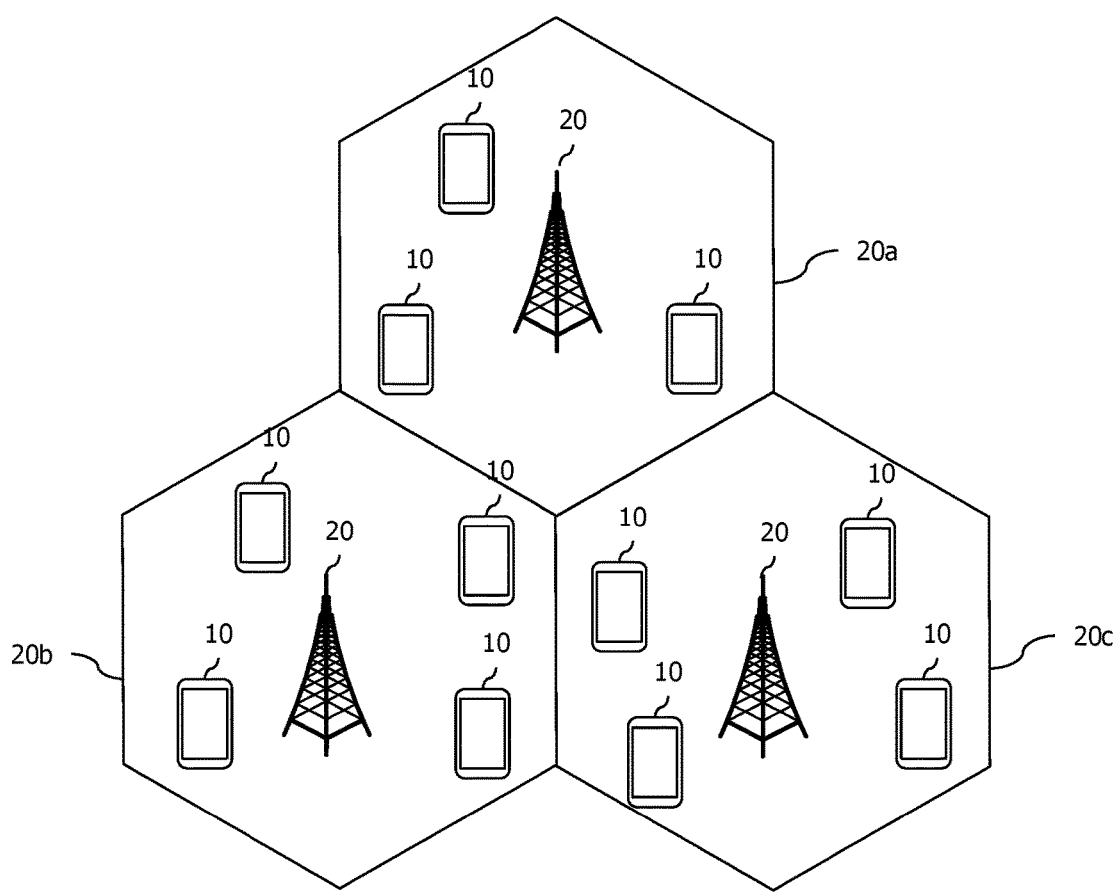
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
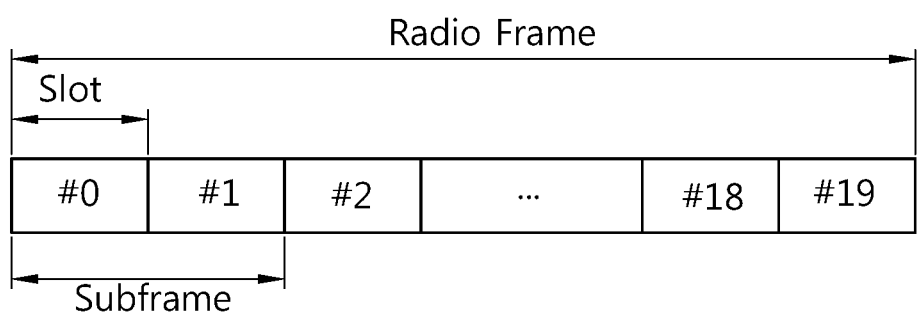
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
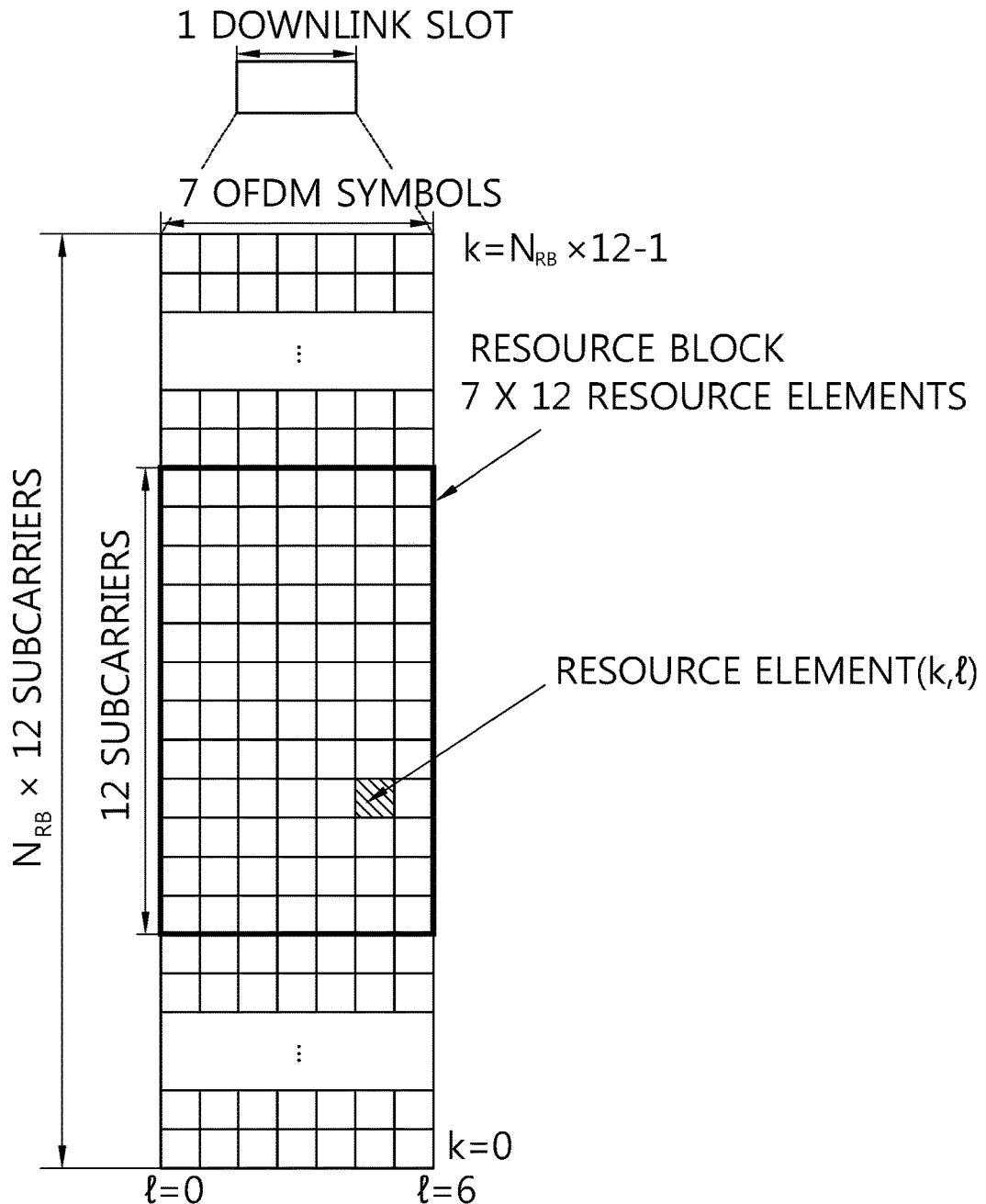
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
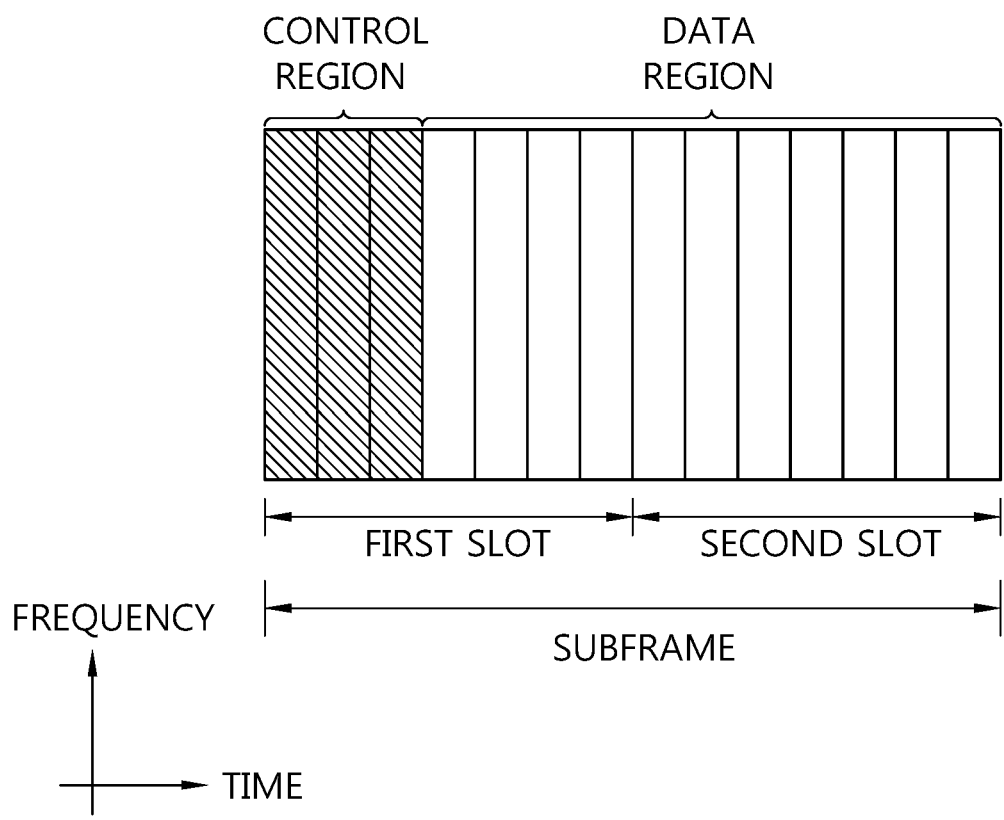
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel). PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
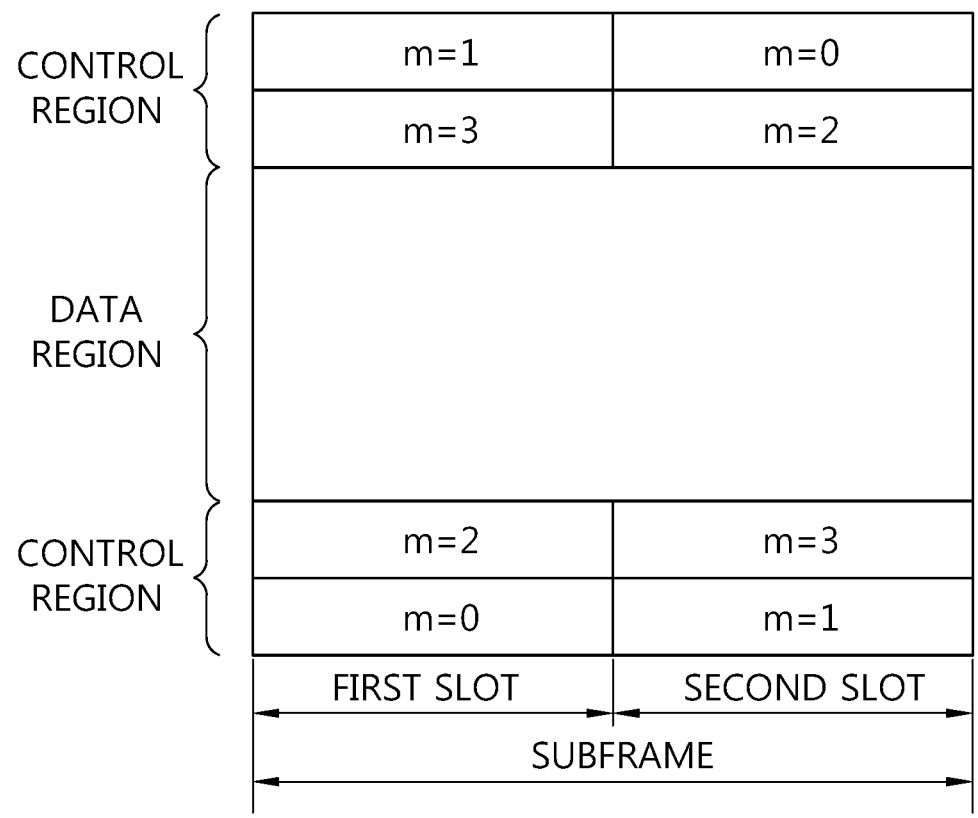
FIG. 5 illustrates the architecture of an uplink subframe in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 6A:
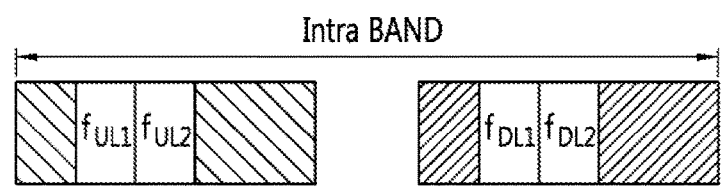
FIGS. 6A and 6B are conceptual views illustrating intra-band carrier aggregation (CA).
Figure 6B:
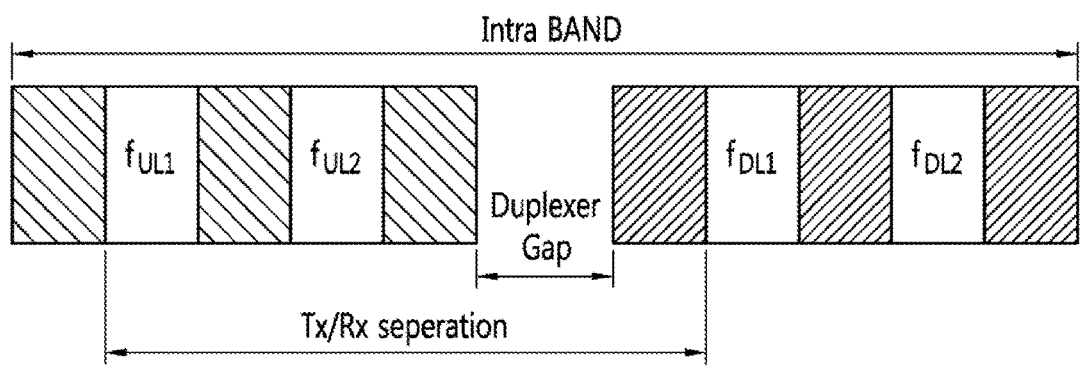

FIGS. 6A and 6B are concept views illustrating intra-band carrier aggregation (CA).

FIG. 6A illustrates intra-band contiguous CA, and FIG. 6B illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 6A and the intra-band non-contiguous CA shown in FIG. 6B.

Figure 7A:
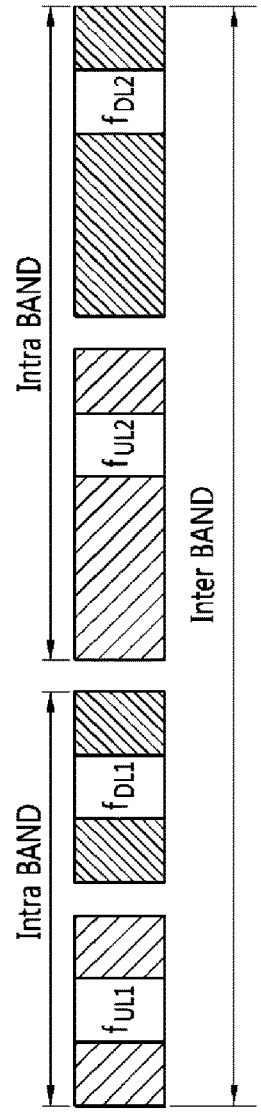
FIGS. 7A and 7B are conceptual views illustrating interband carrier aggregation (CA).
Figure 7B:
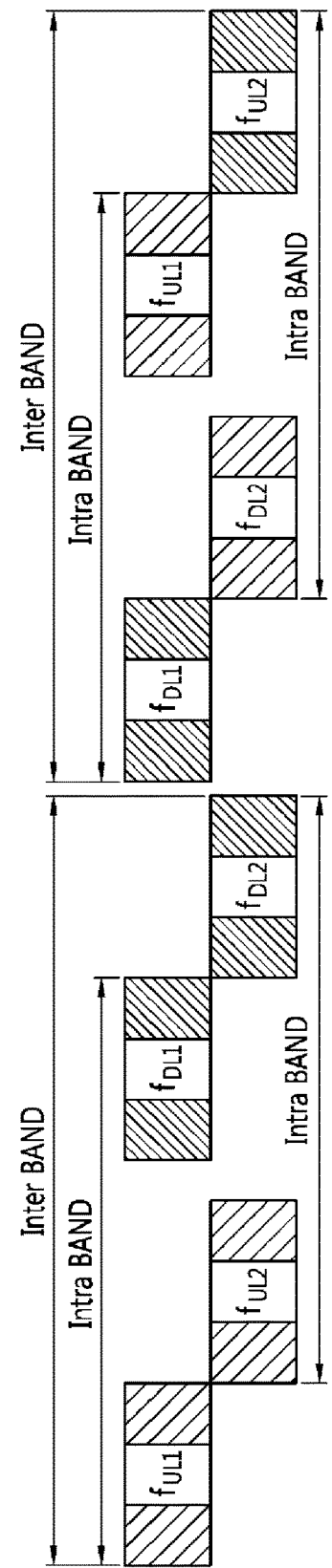

FIGS. 7A and 7B are concept views illustrating inter-band carrier aggregation.

FIG. 7A illustrates a combination of a lower band and a higher band for inter-band CA, and FIG. 7B illustrates a combination of similar frequency bands for inter-band CA.

In other words, the inter-band carrier aggregation may be separated into inter-band CA between carriers of a low band and a high band having different RF characteristics of inter-band CA as shown in FIG. 7A and inter-band CA of similar frequencies that may use a common RF terminal per component carrier due to similar RF (radio frequency) characteristics as shown in FIG. 7B.

TABLE 1

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| . . . | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |

TABLE 1-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

When the operating bands are defined as shown in Table 1, each nation's frequency distributing organization may assign specific frequencies to service providers in compliance with the nation's circumstances.

Meanwhile, intra-band contiguous CA bandwidth classes and their corresponding guard bands are as shown in the following table.

TABLE 2

| CA Bandwidth Class | Aggregated Transmission Bandwidth Configuration | Maximum number of CCs | Nominal Guard Band BWGB |
|---|---|---|---|
| A | $N_{RB,agg}$ ≤ 100 | 1 | $a1BW_{channel(1)}$ − 0.5Δf1 (NOTE2) |
| B | $N_{RB,agg}$ ≤ 100 | 2 | 0.05 max ($BW_{Channel(1)}$, $BW_{Channel(2)}$) − 0.5Δf1 |
| C | 100 < $N_{RB,agg}$ ≤ 200 | 2 | 0.05 max ($BW_{Channel(1)}$, $BW_{Channel(2)}$) − 0.5Δf1 |
| D | 200 < $N_{RB,agg}$ ≤ [300] | FFS | 0.05 max ($BW_{Channel(1)}$, $BW_{Channel(2)}$) − 0.5Δf1 |
| E | [300] < $N_{RB,agg}$ ≤ [400] | FFS | FFS |
| F | [400] < $N_{RB,agg}$ ≤ [500] | FFS | FFS |

NOTE1:
$BW_{Channel(i),j}$ = 1, 2, 3 is the channel bandwidth of the E-UTRA component carriers defined in TS36.101 table 5.6-1, Δf1 represents subcarrier spacing of Δf when downlink, and Δf1 = 0 in downlink.
NOTE2:
In case that the channel frequency bandwidth is 1.4 MHz, a1 = 0.16/1.4, and in the remainder frequency band, a1 = 0.05.

In the above table, the brackets [ ] represent that the value therebetween is not completely determined and may be varied. FFS stands for 'For Further Study.' NRB_agg is the number of RBs aggregated in an aggregation channel band.

Table 3 below shows bandwidth sets respective corresponding to intra-band contiguous CA configurations.

TABLE 3

| E-UTRA CA configuration | Channel frequency bandwidth permitted by each carrier | Channel frequency bandwidth permitted by each carrier | Channel frequency bandwidth permitted by each carrier | Maximum aggregated bandwidth [MHz] | Bandwidth Combination Set |
|---|---|---|---|---|---|
| CA_1C | 15 20 | 15 20 | | 40 | 0 |
| CA_3C | 5, 10, 15 20 | 20 5, 10, 15, 20 | | 40 | 0 |
| CA_7C | 15 20 10 15 20 | 15 20 20 15, 20 10, 15, 20 | | 40 40 | 0 1 |
| CA_23B | 10 5 | 10 15 | | 20 | 0 |
| CA_27B | 1.4, 3, 5 1.4, 3 | 5 10 | | 13 | 0 |
| CA_38C | 15 20 | 15 20 | | 40 | 0 |
| CA_39C | 5, 10, 15 20 | 20 5, 10, 15 | | 35 | 0 |
| CA_40C | 10 15 20 | 20 15 10, 20 | | 40 | 0 |
| CA_41C | 10 15 20 5, 10 15 20 | 20 15, 20 10, 15, 20 20 15, 20 5, 10, 15, 20 | | 40 40 | 0 1 |
| CA_40D | 10, 20 20 20 | 20 10 20 | 20 20 10 | 60 | 0 |
| CA_41D | 10 10 15 15 20 20 | 20 15, 20 20 10, 15, 20 15, 20 10, 15, 20 | 15 20 10, 15 20 10 15, 20 | 60 | 0 |
| CA_42C | 5, 10, 15, 20 20 | 20 5, 10, 15 | 5, 10, 15, 20 20 | 40 | 0 |

In the above table, CA configuration represents an operating bandwidth and CA bandwidth class. For example, CA_IC means operating band 2 in Table 2 and CA band class C in Table 3. All of the CA operating classes may apply to bands that are not shown in the above table. In addition, class D is added in Rel-12 as represented in the above table, through this, maximum 3 carriers can be transmitted from the intra-band continuous CA at the same time.

Figure 8:
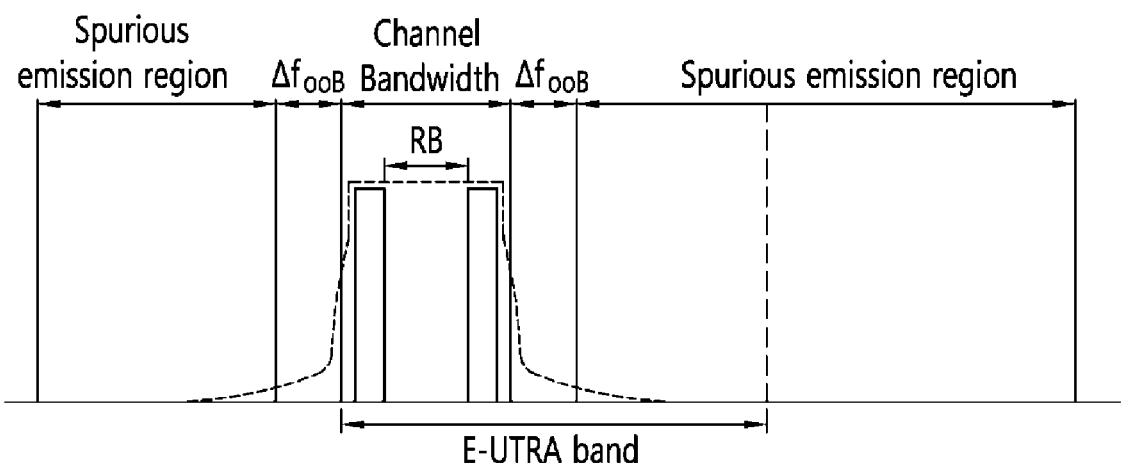
FIG. 8 diagrammatically expresses a concept of unwanted emission in addition to a wanted signal and a self transmission band for minimizing an influence exerted on an adjacent channel by a filter in transmission.
Figure 9:
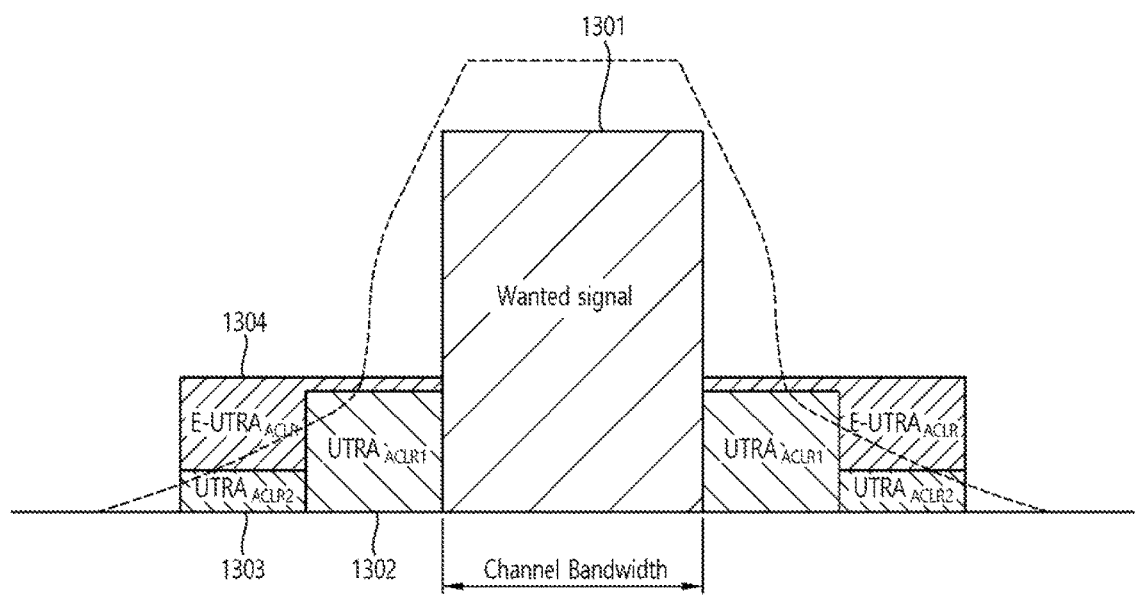
FIG. 9 illustrates a unwanted emission standard in an out-of-band which is generally called among the unwanted emission illustrated in FIG. 8.
Figure 10:
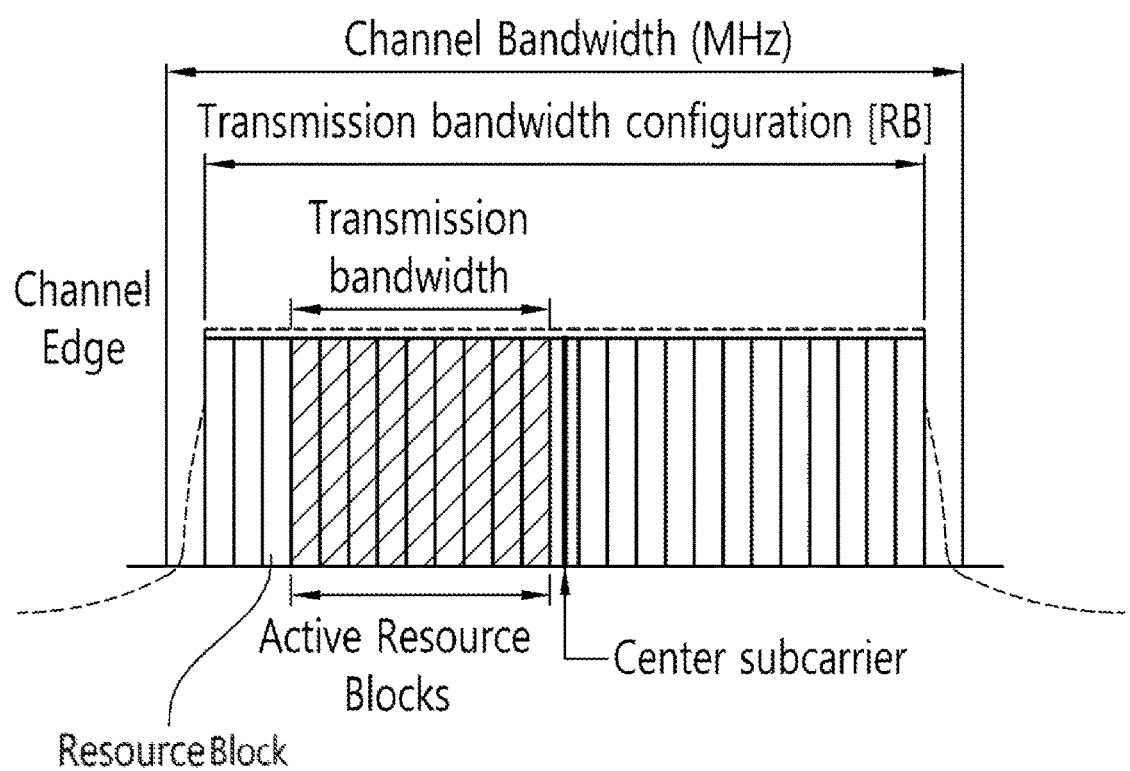
FIG. 10 illustrates a relationship between a channel band (MHz) and a resource block (RB) illustrated in FIG. 8.

FIG. 8 diagrammatically expresses a concept of unwanted emission in addition to a wanted signal and a self transmission band for minimizing an influence exerted on an adjacent channel by a filter in transmission, FIG. 9 illustrates a unwanted emission standard in an out-of-band which is generally called among the unwanted emission illustrated in FIG. 8, and FIG. 10 illustrates a relationship between a channel band (MHz) and a resource block (RB) illustrated in FIG. 8.

As can be seen from FIG. 8, a transmission modem sends a signal over a channel bandwidth assigned in an E-UTRA band.

Here, the channel bandwidth is defined as can be seen from FIG. 10. That is, a transmission bandwidth is set to be smaller than the channel bandwidth (BWChannel). The transmission bandwidth is set by a plurality of resource blocks (RBs). The outer edges of the channel are the highest and lowest frequencies that are separated by the channel bandwidth.

Meanwhile, as described above, the 3GPP LTE system supports channel bandwidths of 1.4 MHz, 3 MHz, 5 MHz, 10 MHz, 15 MHz, and 20 MHz. The relationship between such channel bandwidths and the number of resource blocks is as below.

TABLE 4

| Channel bandwidth $BW_{Channel}$ [MHz] | 1.4 | 3 | 5 | 10 | 15 | 20 |
|---|---|---|---|---|---|---|
| Transmission bandwidth settings NRB | 6 | 15 | 25 | 50 | 75 | 100 |

Referring back to FIG. 8, the unwanted emission occurs in a band of ΔfOOB and further, as illustrated in FIG. 8, the unwanted emission occurs even in a spurious area. Herein, ΔfOOB means a size of a frequency of an out of band (OOB) and is shown by a table given below.

TABLE 5

| Channel bandwidth | 1.4 MHz | 3.0 MHz | 5 MHz | 10 MHz | 15 MHz | 20 MHz |
|---|---|---|---|---|---|---|
| Out-of-band boundary $F_{OOB}$ (MHz) | 2.8 | 6 | 10 | 15 | 20 | 25 |

Meanwhile, emission on the out of band represents emission which occurs in a band adjacent to an intended transmission band. Spurious emission represents emitting a unwanted wave in a frequency area further from the intended transmission band than the out of band.

Meanwhile, in 3GPP release 8, in a case of transmission by an LTE terminal, basic spurious emission (SE) to be minimally exceeded is defined according to a corresponding frequency range and in release 10, an SE standard applied in a case of transmission by an LTE-A terminal supporting CA is additionally defined.

Meanwhile, as illustrated in FIG. 9, when the transmission is performed in an E-UTRA channel band 1301, the wave leaks to out-of-bands (reference numerals 1302, 1303, and 1304 in the illustrated area), that is, is unwantedly emitted.

Herein, illustrated $UTRA_{ACLR1}$ is a restricted standard for a ratio to leak to the adjacent channel 1302, that is, UTRA channel 1, that is, an adjacent channel leak ratio in the case of protecting the UTRA terminal in the immediately adjacent channel 1302 when the terminal transmits the wave in the E-UTRA channel 1301. In addition, the $UTRA_{ACLR2}$ is a ratio which leaks to the adjacent channel 1303, that is, UTRA channel 2, that is, the adjacent channel leak ratio in the case of protecting the UTRA terminal in the channel 1303 positioned next to the adjacent channel 1302. Moreover, the $E-UTRA_{ACLR}$ is a restricted standard for a ratio which leaks to the adjacent channel 1304 having the same channel bandwidth of the E-UTRA in the immediately adjacent frequency area, that is, the E-UTRA channel, that is, the adjacent channel leak ratio when the terminal transmits the wave in the E-UTRA channel 1301, as illustrated in FIG. 9.

As set forth above, if transmission is conducted in an assigned channel band, unwanted emission occurs to adjacent channels.

As described above, unwanted emission arises to bands adjacent to each other. At this time, with respect to interference caused by transmission from the base station, the amount of interference to adjacent bands may be reduced to an allowed reference or less by designing a high-price and bulky RF filter in view of the base station's nature. On the contrary, in the case of the terminal, it is difficult to completely prevent interference to adjacent bands due to, e.g., the limited size of terminal and limited price of the power amplifier or pre-duplex filter RF device.

Accordingly, the terminal's transmission power needs to be limited.

In the LTE system, a maximum power Pcmax in the UE is simply expressed as follows.

$$Pcmax = Min(Pemax, Pumax) \qquad \text{[Equation 1]}$$

Where, the Pcmax represents maximum power (actual maximum transmission power) where the UE may transmit in a corresponding cell, and the Pemax represents usable maximum power in a corresponding cell to which the BS signals. Further, the Pumax represents maximum power of the UE on which Maximum Power Reduction (hereinafter referred to as "MPR") and Additive-MPR (hereinafter referred to as "A-MPR") are considered.

The maximum power $P_{PowerClass}$ of the UE is listed in a following table 6.

TABLE 6

| Operating band | Power class 1 (dBm) | Power class 3 (dBm) |
|---|---|---|
| 1, 2, 3, 4, 5, 6, 7, 8, 9, 10, 11, 12, 13, 14, 17, 18, 18, 19, 20, 21, 22, 23, 24, 25, 26, 27, 28, 30, 31, 33, 34, 35, 36, 37, 38, 39, 40, 41, 42, 43, 44 | | 23 dBm |
| 14 | | 31 dBm |

Meanwhile, in a case of intra-band continuous CA. maximum power PPowerClass of the UE is listed in a following table 6.

TABLE 7

| Operating Band | Power class 3 (dBm) |
|---|---|
| CA_1C | 23 dBm |
| CA_3C | 23 dBm |
| CA_7C | 23 dBm |
| CA_38C | 23 dBm |
| CA_39C | 23 dBm |
| CA_40C | 23 dBm |
| CA_41C | 23 dBm |
| CA_42C | 23 dBm |

Figure 11:
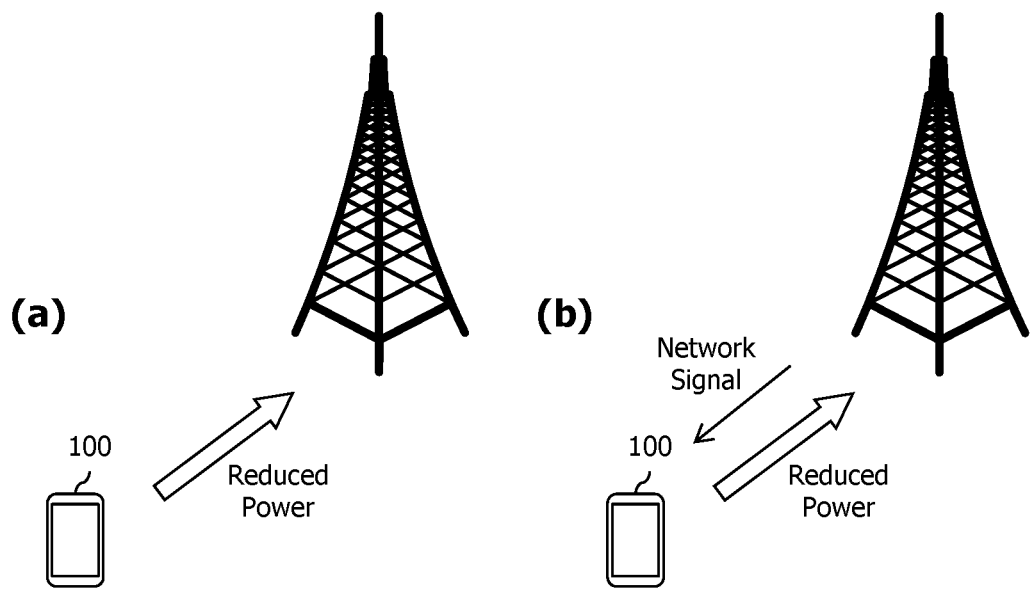
FIG. 11 is an exemplary diagram illustrating a method for limiting transmission power of a terminal.

FIG. 11 illustrates an example of a method of limiting transmission power of a terminal.

As can be seen from (a) portion of FIG. 11, the terminal 100 conducts transmission with transmission power limited In case a PAPR (peak-to-average power ratio) is increased, linearity of the power amplifier (PA) is reduced, as an MPR (maximum power reduction) value for limiting transmission power, an MPR value up to 2 dB may apply depending on modulation schemes in order to maintain such linearity.

<MPR According to 3GPP Release 11>

Meanwhile, according to 3GPP release 11, the terminal adopts multi-cluster transmission in a single CC (component carrier) and may simultaneously transmit a PUSCH and a PUCCH. As such, if the PUSCH and the PUCCH are transmitted at the same time, the size of the IM3 component (which means a distortion signal generated by intermodulation) that occurs at an out-of-band area may be increased as compared with the existing size, and this may serve as larger interference to an adjacent band. Thus, the following MPR value may be set so as to meet general spurious emission, ACLR (adjacent channel leakage ratio) and general SEM (spectrum emission mask) that are the terminal's emission requirements that should be observed by the terminal upon uplink transmission.

<A-MPR>

As can be seen from (b) portion of FIG. 11, the base station may apply A-MPR (additional maximum power reduction) by transmitting a network signal (NS) to the terminal 100. The A-MPR, unlike the above-mentioned MPR, is that the base station transmits the network signal (NS) to the terminal 100 operating at a specific operating band so that the terminal 100 conducts additional power reduction in order not to affect adjacent bands, for example, not to give interference to the adjacent bands. That is, if a terminal applied with MPR receives a network signal (NS), A-MPR is additionally applied to determine transmission power.

The following table represents A-MPR values per network signal.

TABLE 8

| Network Signaling value | Channel bandwidth (MHz) | Resources Blocks (NRB) | A-MPR (dB) |
|---|---|---|---|
| NS_01 | 1.4, 3, 5, 10, 15, 20 | | Not defined |
| NS_03 | 3 | >5 | ≤1 |
| | 5 | >6 | ≤1 |
| | 10 | >6 | ≤1 |
| | 15 | >8 | ≤1 |
| | 20 | >10 | ≤1 |
| NS_04 | 5 | >6 | ≤1 |
| NS_05 | 10, 15, 20 | ≥50 | ≤1 |
| NS_06 | 1.4, 3, 5, 10 | — | Not defined |
| NS_07 | 10 | Shown in Table 9 | |
| NS_08 | 10, 15 | >44 | ≤3 |
| NS_09 | 10, 15 | >40 | ≤1 |
| | | >55 | ≤2 |
| NS_18 | 5 | ≥2 | ≤1 |
| | 10, 15, 20 | ≥1 | ≤4 |

The following table represents A-MPR values when the network signal is NS_07.

TABLE 9

| Parameter | | Region A | Region B | | Region C |
|---|---|---|---|---|---|
| $RB_{start}$ | | 0-12 | 13-18 | 19-42 | 43-49 |
| $L_{CRB}$ [RBs] | 6-8 | 1-5, 9-50 | ≥8 | ≥18 | ≤2 |
| A-MPR [dB] | ≤8 | ≤12 | ≤12 | ≤6 | ≤3 |

In the above table, $RB_{start}$ indicates the lowest RB index of a transmission RB. $L_{CRB}$ indicates the length of consecutive RB allocations.

For example, in case the terminal provided with a service using a 10 MHz channel bandwidth receives NS_07 as a network signal, the terminal determines transmission power according to the above table and transmits the determined transmission power. In other words, in case the terminal instructs 5 RBs to be continuously sent from the 10th RB that is a start point of the RBs when decoding a received uplink grant, the terminal may send the A-MPR value with up to 12 dB applied.

<A-MPR According to CA>

On the other hand, when the CA is considered, an uplink channel bandwidth may increase up to a maximum of 40 MHz (20 MHz+20 MHz), and as a result, an A-MPR value and CA_NS_XX for additional CA is standardized as a simulation result for satisfying SEM/ACLR/SE a and Public Safety standards for protecting the adjacent band. That is, when the base station transmits the network signal to the terminal in order to protect a specific band in the CA environment, additional power reduction is performed with respect to the terminal which operates in the specific band to protect the adjacent band.

Meanwhile, up to now, in a situation in which a maximum of two downlink carriers are aggregated required MPR and A-MPR, and the like have been researched. However, a situation in which three downlink carriers and two uplink carriers are aggregated has not researched up to now. Therefore, hereinafter, the situation will be proposed.

<Aggregation of Three Downlink Carriers and Two Uplink Carriers>

Hereinafter, when the terminal transmits the uplink signal through two uplink carriers in an aggregation situation in which three downlink carriers and two uplink carriers are aggregated, it is analyzed whether interference leaks to the downlink band of the terminal and thereafter, a solution for the leakage is presented.

Figure 12:
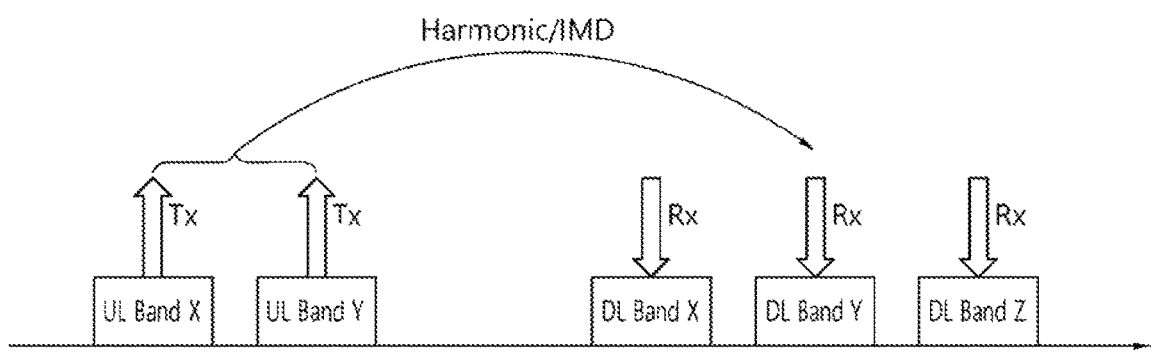
FIG. 12 illustrates a harmonic component and an intermodulation distortion (IMD)

In more detail, presented is a scheme for preventing receiving sensitivity from being decreased as the generated harmonics component and intermodulation distortion (IMD) component flow into the downlink band of the terminal when the terminal transmits the uplink signal through two uplink carriers as shown in FIG. 12. Moreover, since a receiving sensitivity level in the downlink band of the terminal may not be completely prevented from being decreased with cross isolation and coupling loss by the PCB even though the terminal appropriately solves the decrease in receiving sensitivity, a scheme for alleviating requirements which the terminal satisfies in the related art is presented.

The scheme will be described below in detail.

First, a combination in which three downlink carriers and two uplink carriers may be aggregated is researched. The combination is shown below by a table.

TABLE 10

| Carrier aggregation | Combination of downlink carrier bands | Combination of uplink carrier bands | Frequency | Carrier aggregation of FDD and TDD |
|---|---|---|---|---|
| 2UL/3DL inter-band CA | B1 + B3 + B5 | B1 + B3 (High-High) B1 + B5 (Low-High) B3 + B5 (Low-High) | 2.1 G + 1.8 G + 800M | X |
| | B1 + B3 + B8 | B1 + B3 (High-High) B1 + B8 (Low-High) B3 + B8 (Low-High) | 2.1 G + 1.8 G + 900M | X |

TABLE 10-continued

| Carrier aggregation | Combination of downlink carrier bands | Combination of uplink carrier bands | Frequency | Carrier aggregation of FDD and TDD |
|---|---|---|---|---|
| | B1 + B3 + B19 | B1 + B3 (High-High)<br>B1 + B19 (Low-High)<br>B3 + B19 (Low-High) | 2.1 G + 1.8 G + 800M | X |
| | B1 + B5 + B7 | B1 + B5 (Low-High)<br>B1 + B7 (High-High)<br>B5 + B7 (Low-High) | 2.1 G + 800M + 2.6 G | X |
| | B1 + B18 + B28 | B1 + B18 (Low-High)<br>B1 + B28 (Low-High)<br>B18 + B28 (Low-Low) | 2.1 G + 800M + 700M | X |
| | B1 + B19 + B21 | B1 + B19 (Low-High)<br>B1 + B21 (Mid-High)<br>B19 + B21 (Low-Mid) | 2.1 G + 800M + 1.5 G | X |
| | B2 + B4 + B12 | B2 + B4 (High-High)<br>B4 + B12 (Low-High) | 1.9 G + 2.1 G + 700M | X |
| | B2 + B5 + B13 | B2 + B13 (Low-High) | 1.9 G + 800M + 700M | X |
| | B3 + B7 + B20 | B3 + B7 (High-High)<br>B3 + B20 (Low-High)<br>B7 + B20 (Low-High) | 1.8 G + 2.6 G + 800M | X |
| | B4 + B5 + B13 | B4 + B13 (Low-High) | 2.1 G + 800M + 700M | X |
| | B3 + B7 + B28 | B3 + B7 (High-High)<br>B3 + B28 (Low-High)<br>B7 + B28 (Low-High) | 1.8 G + 2.6 G + 700M | X |
| 2UL/3DL mixed intra/inter-band CA | B3 + B3 + B7 | B3 + B3 (High-High)<br>B3 + B7 (High-High) | 1.8 G + 1.8 G + 2.6 G | X |
| | B3 + B7 + B7 | B3 + B7 (High-High)<br>B7 + B7 (High-High) | 1.8 G + 2.6 G + 2.6 G | X |
| | B25 + B41 + B41 | B41 + B41 (High-High) | 1.9 G + 2.6 G + 2.6 G | ○ |

When the terminal transmits the uplink signal through two uplink carriers according to the combinations, the harmonics component and the IMD component are generated, and as a result, whether the interference is applied to the downlink band of the terminal is researched and a research result is shown in a table given below.

TABLE 11

| Configuration of downlink carrier aggregation | Configuration of uplink carrier aggregation | Harmonics component for third band when is no uplink | IMD component for third band when is no uplink | Interference when inter-band spacing is small | MSD |
|---|---|---|---|---|---|
| CA_1A-3A-5A | CA_1A-3A | — | — | — | Not applicable |
| | CA_1A-5A | — | — | yes | Already handled in CA_1A-5A in 2DL/2UL CA See document TS 36.101 |
| CA_1A-3A-8A | CA_3A-5A | — | — | — | Not applicable |
| | CA_1A-3A | — | — | — | Not applicable |
| | CA_1A-8A | Second harmonics component | — | yes | Already handled in CA_1A-8A in 1UL/2DL See document TS 36.101 |
| CA_1A-3A-19A | CA_3A-8A | — | — | — | Not applicable |
| | CA_1A-3A | — | — | — | Not applicable |
| | CA_1A-19A | — | — | yes | Adjacent interference problem has already been handled in CA_1A-3A See document TS 36.101 |
| CA_1A-5A-7A | CA_3A-19A | — | — | — | Not applicable |
| | CA_1A-5A | — | — | — | Not applicable |
| | CA_1A-7A | — | Fifth IMD component | — | IMD component becomes problematic |
| CA_1A-18A-28A | CA_5A-7A | — | — | — | Not applicable |
| | CA_1A-18A | — | — | yes | Adjacent interference problem has already been |

TABLE 11-continued

| Configuration of downlink carrier aggregation | Configuration of uplink carrier aggregation | Harmonics component for third band when is no uplink | IMD component for third band when is no uplink | Interference when inter-band spacing is small | MSD |
|---|---|---|---|---|---|
| | CA_1A-28A | — | Fifth IMD component | — | handled in CA_18A-28A See document TS 36.101 Fifth IMD is generated, but not applicable when a specific frequency of a provider is considered |
| | CA_18A-28A | B28 third harmonics | Fifth IMD component | — | Third harmonics and fifth IMD are generated, but not applicable when a specific frequency of a provider is considered |
| CA_1A-19A-21A | CA_1A-19A | — | — | — | Not applicable |
| | CA_1A-21A | — | — | — | Not applicable |
| | CA_19A-21A | — | — | — | Not applicable |
| CA_2A-4A-12A | CA_2A-4A, CA_4A-12A | — | Fourth IMD component | — | Since band influenced by IMD is small, not actually applicable |
| CA_2A-5A-13A | CA_2A-13A | — | — | — | Not applicable |
| CA_3A-7A-20A | CA_3A-7A | — | Second IMD component | — | IMD component becomes problematic |
| | CA_3A-20A | — | Second IMD component | — | IMD component becomes problematic |
| | CA_7A-20A | — | — | — | Not applicable |
| CA_4A-5A-13A | CA_4A-13A | — | — | — | Not applicable |
| CA_3A-7A-28A | CA_3A-7A | | Second IMD component | | IMD component becomes problematic |
| | CA_7A-28A | | Second IMD component | | IMD component becomes problematic |
| CA_3A-7C | CA_3A-7A | | Fourth IMD component | — | Already handled in CA_3A-7A in 2DL/2UL CA See document TS 36.101 |
| | CA_7C | | | — | Not applicable |
| CA_3C-7A | CA_3A-7A | | Fourth IMD component | — | Already handled in CA_3A-7A in 2DL/2UL CA See document TS 36.101 |
| | CA_3C | | | — | Not applicable |
| CA_25A-41C | CA_41C | | | — | Not applicable |

When the uplink signal is transmitted through two uplink carriers as shown in the table given above, it is analyzed that the IMD component is generated in a total of 5 combinations.

As a scheme for preventing the IMD component from being generated, a filter may be added so as for each transmitting end to remove the frequency at which the IMD component or the harmonics component is generated.

However, although the filter is added as described above, the size of the IMD component or the harmonics component which flows into the downlink band of the terminal itself is just slightly decreased and an actually exerted influence may not be completely removed.

Therefore, in the disclosure of the present specification, a measurement value for the IMD component generated in each non-linear element and it is analyzed whether the size of the corresponding IMD component is changed when passing through each element to research how the receiving sensitivity level in the downlink band of the terminal is decreased. In addition, presented is a scheme in which the terminal alleviates requirements which need to be satisfied with respect receiving reference sensitivity (REFSENS) in the related art through the researched decrease of the receiving sensing level.

Conditions in the receiving sensitivity level research are described below.

TABLE 12

| Downlink carrier aggregation | Uplink carrier aggregation | IMD component | | Uplink center frequency $F_c$ (MHz) | Uplink bandwidth (MHz) | Number of uplink RBs | Third downlink bandwidth center frequency $F_c$ (MHz) | Downlink bandwidth (MHz) | CF (dB) |
|---|---|---|---|---|---|---|---|---|---|
| B1 + B5 + B7 | B1 B7 | IMD 5 | $3 * f_{B1} - 2 * f_{B7}$ | 1968 2512 | 5 10 | 25 50 | 880 | 5 | 4.37 |
| B3 + B7 + B20 | B3 B7 | IMD 2 | $f_{B7} - f_{B3}$ | 1737 2543 | 5 10 | 25 50 | 806 | 5 | 2.63 |
| | B3 B20 | IMD 2 | $f_{B3} + f_{B20}$ | 1775 855 | 10 5 | 50 25 | 2630 | 10 | 0.29 |
| | B3 B20 | IMD 3 | $2 * f_{B3} - f_{B20}$ | 1750 847 | 10 5 | 50 25 | 2653 | 10 | 1.20 |
| B3 + B7 + B28 | B3 B7 | IMD 2 | $f_{B7} - f_{B3}$ | 1747 2543 | 5 5 | 25 25 | 796.0 | 5 | 1.24 |
| | B3 B28 | IMD 3 | $2 * f_{B3} - f_{B28}$ | 1712.5 745.5 | 5 5 | 25 25 | 2679.5 | 5 | 1.55 |
| | B7 B28 | IMD 2 | $f_{B7} - f_{B28}$ | 2543 710.5 | 5 5 | 25 25 | 1832.5 | 5 | 0.84 |

In the above table, the center frequency of the uplink carrier is configured so that the harmonics component and the IMD component flow into the downlink band of the terminal and even in this case, maximum sensitivity degradation (MSD) is applied to alleviate the receiving sensitivity degradation.

Further, similarly even to the center frequency Fc of the downlink carrier, the center frequency Fc is determined in an area where the IMD component is generated. The correction factor (CF) as a correction component for acquiring the MSD in order to distinguish and apply a difference between total power of the IMD component and power of the IMD component which influences an actual bandwidth of a modulated signal is actually measured and used.

A reference architecture is required to measure a change in size component of a signal in input/output in each element according to MSD simulation and element characteristics depending on the IMD component and the harmonics component and the MSD value is derived by determining whether elements used according to an actual carrier aggregation combination, for example, a cascaded diplexer, a triplexer, a quadplexer, a hexaplexer, and an additional filter are used.

Figure 13:
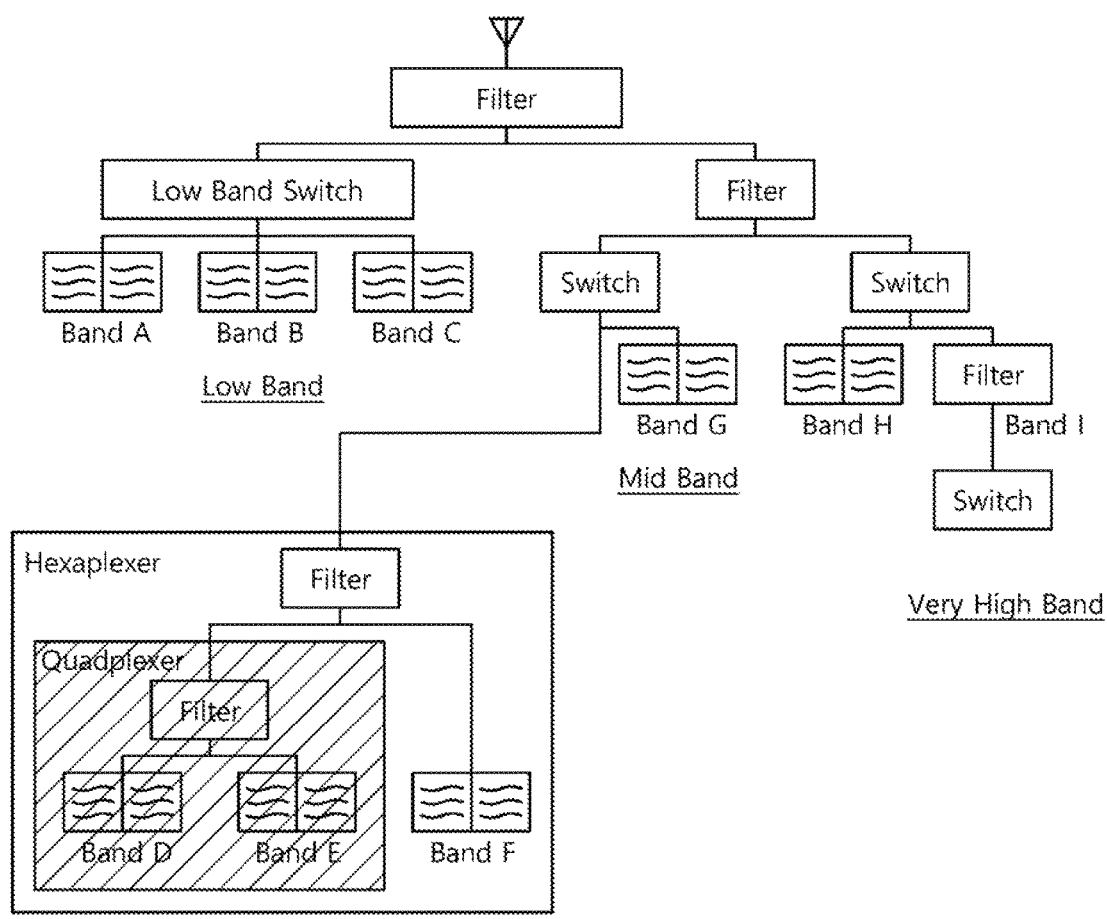
FIG. 13 illustrates one example of an RF architecture which can be used for aggregation of three downlink carriers and two uplink carriers.

FIG. 13 illustrates one example of an RF architecture which can be used for aggregation of three downlink carriers and two uplink carriers.

The RF architecture illustrated in FIG. 13 which is a structure which may be used for aggregation of three downlink carriers and two uplink carriers may include various elements including the a diplexer, a duplexer, the quadplexer, the hexaplexer, and the like.

Data is described below, which is acquired by an output variation amount depending on an input signal of a switch and the diplexer, the diplexer, the duplexer, the quadplexer, the hexaplexer, and a low noise amplifier (LNA) used in the architecture and a variation amount of a signal strength in an input/output of a power amplifier (PA).

TABLE 13

| Reference architecture | Cascade diplexer architecture | | | | Quadplexer architecture | | | |
|---|---|---|---|---|---|---|---|---|
| Carrier | B1 + B5 + B7 & B1 + B7 B3 + B7 + B20 & B3 + B7 B3 + B7 + B20 & B3 + B20 B3 + B7 + B28 & B3 + B7 B3 + B7 + B28 & B3 + B28 B3 + B7 + B28 & B7 + B28 | | | | B1 + B3 + BX & B1 + B3 | | | |
| | IP2 (dBm) | IP3 (dBm) | IP4 (dBm) | IP5 (dBm) | IP2 (dBm) | IP3 (dBm) | IP4 (dBm) | IP5 (dBm) |
| Antenna switch | 112 | 68 | 55 | 55 | 112 | 68 | 55 | 55 |
| Diplexer (L + H) | 115 | 87 | 55 | 55 | — | — | — | — |
| Diplexer (H + H) | 110 | 85 | 55 | 55 | 110 | 85 | 55 | 55 |
| Quadplexer | — | — | — | — | 110 | 72 | 55 | 52 |
| Duplexer | 100 | 75 | 55 | 53 | 100 | 75 | 55 | 53 |
| PA Forward | 28.5 | 32 | 30 | 28 | 28.5 | 32 | 30 | 28 |
| PA Reversed | 40 | 30.5 | 30 | 30 | 40 | 30.5 | 30 | 30 |
| LNA | 10 | 0 | 0 | −10 | 10 | 0 | 0 | −10 |

Further, when an isolation characteristic of the corresponding RF elements is organized, the isolation characteristic has characteristics shown in a table given below.

TABLE 14

| Isolation parameter | Value (dB) | Element |
|---|---|---|
| Antenna to antenna | 10 | Main antenna to diversity antenna |
| PA (out) to PA (in) | 60 | PCB isolation (PA forward mixing) |
| Diplexer | 15 | High (H)/low(L) band isolation |
| Diplexer | 10 | High (H)/low(L) band isolation |
| PA (out) to PA (out) | 60 | L-H/H-L cross band (diplexer + duplexer) |
| PA (out) to PA (out) | 50 | H-H cross band (diplexer + diplexer) |
| LNA (in) to PA (out) | 60 | L-H/H-L cross band (diplexer + diplexer) |
| LNA (in) to PA (out) | 50 | H-H cross band (diplexer + diplexer) |
| Duplexer | 50 | Rejection Tx band in Rx band |

In respect to an alleviation value for the receiving sensitivity level predicted according to the IMD component by using the measurement data and the isolation characteristic of the element, an output IMD value is obtained according to equations given below.

$$P_{IMD2} = |a|*P_1 + |b|*P_2 - IP2 \quad \text{[Equation 2]}$$

Where, $|a|+|b|=2$ and P1 and P2 represent input power of each element.

$$P_{IMD3} = |a|*P_1 + |b|*P_2 - 2 \cdot IP3 \quad \text{[Equation 3]}$$

Where, $|a|+|b|=3$ and P1 and P2 represent the input power of each element.

$$P_{IMD4} = |a|*P_1 + |b|*P_2 - 3 \cdot IP3 \quad \text{[Equation 4]}$$

Where, $|a|+|b|=4$ and P1 and P2 represent the input power of each element.

$$P_{IMD5} = |a|*P_1 + |b|*P_2 - 4 \cdot IP3 \quad \text{[Equation 5]}$$

Where, $|a|+|b|=5$ and P1 and P2 represent the input power of each element.

As a result, a predicted maximum sensitivity degradation (MDS0 value is proposed as shown in a table given below.

TABLE 15

| Configuration of downlink carrier aggregation | Configuration of uplink carrier aggregation | IMD | | UL center frequency Fc (MHz) | UL bandwidth (MHz) | Number of uplink RBs | Center frequency of third downlink carrier Fc (MHz) | Downlink bandwidth (MHz) | CF (dB) | MSD (dB) |
|---|---|---|---|---|---|---|---|---|---|---|
| B1 + B5 + B7 | B1 | IMD 5 | $3 * f_{B1} -$ | 1968 | 5 | 25 | 880 | 5 | 4.37 | 0.22 |
| | B7 | | $2 * f_{B7}$ | 2512 | 10 | 50 | | | | |
| B3 + B7 + B20 | B3 | IMD 2 | $f_{B7} -$ | 1737 | 5 | 25 | 806 | 5 | 2.63 | 22.0 |
| | B7 | | $f_{B3}$ | 2543 | 10 | 50 | | | | |
| | B3 | IMD 2 | $f_{B3} +$ | 1775 | 10 | 50 | 2630 | 10 | 0.29 | 22.7 |
| | B20 | | $f_{B20}$ | 855 | 5 | 25 | | | | |
| | B3 | IMD 3 | $2 * f_{B3} -$ | 1750 | 10 | 50 | 2653 | 10 | 1.20 | 1.8 |
| | B20 | | $f_{B20}$ | 847 | 5 | 25 | | | | |
| B3 + B7 + B28 | B3 | IMD 2 | $f_{B7} -$ | 1747 | 5 | 25 | 796.0 | 5 | 1.24 | 18.7 |
| | B7 | | $f_{B3}$ | 2543 | 5 | 25 | | | | |
| | B3 | IMD 3 | $2 * f_{B3} -$ | 1712.5 | 5 | 25 | 2679.5 | 5 | 1.55 | 13.4 |
| | B28 | | $f_{B28}$ | 745.5 | 5 | 25 | | | | |
| | B7 | IMD 2 | $f_{B7} -$ | 2543 | 5 | 25 | 1832.5 | 5 | 0.84 | 25.6 |
| | B28 | | $f_{B28}$ | 710.5 | 5 | 25 | | | | |

When the MSD presented in the above table is reflected to TS36.101, a first decimal point is rounded off as proposed as below.

TABLE 16

E-UTRA band/channel bandwidth/Number of RBs ($N_{RB}$)/duplex mode

| Configuration of downlink carrier aggregation | Configuration of uplink carrier aggregation | EUTRA band | UL center frequency Fc (MHz) | UL bandwidth (MHz) | $ULC_{LRB}$ | Center frequency of third downlink carrier Fc (MHz) | Downlink bandwidth (MHz) | MSD (dB) | Duplex mode |
|---|---|---|---|---|---|---|---|---|---|
| CA_1A-5A-7A | CA_1A-7A | 1 | 1968 | 5 | 25 | 880 | 5 | 0.0 | FDD |
| | | 7 | 2512 | 10 | 50 | | | | |
| CA_3A-7A-20A | CA_3A-7A | 3 | 1737 | 5 | 25 | 806 | 10 | 22.0 | FDD |
| | | 7 | 2543 | 10 | 50 | | | | |
| | CA_3A-20A | 3 | 1775 | 10 | 50 | 2630 | 10 | 23.0 | FDD |
| | | 20 | 855 | 5 | 25 | | | | |
| CA_3A-7A-28A | CA_3A-7A | 3 | 1747 | 5 | 25 | 796.0 | 5 | 19.0 | FDD |
| | | 7 | 2543 | 5 | 25 | | | | |
| | CA_3A-28A | 3 | 1712.5 | 5 | 25 | 2679.5 | 5 | 13.0 | FDD |
| | | 28 | 745.5 | 5 | 25 | | | | |
| | CA_7A-28A | 7 | 2543 | 5 | 25 | 1832.5 | 5 | 26.0 | FDD |
| | | 28 | 710.5 | 5 | 25 | | | | |

The embodiments of the present invention which has been described up to now may be implemented through various means. For example, the embodiments of the present invention may be implemented by hardware, firmware, software, or combinations thereof. In detail, the embodiments will be descried with reference to the drawings.

Figure 14:
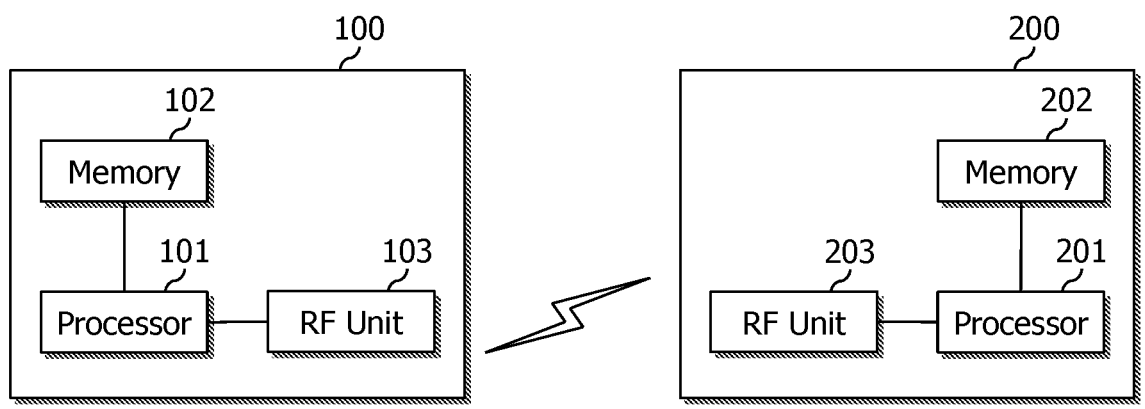
FIG. 14 is a block diagram illustrating a wireless communication system in which a disclosure of the present specification is implemented.

FIG. 14 is a block diagram illustrating a wireless communication system in which a disclosure of the present specification is implemented.

The base station 200 includes a processor 210, a memory 220, and a radio frequency (RF) unit 230. The memory 220 is connected with the processor 210 to store various pieces of information for driving the processor 210. The RF unit 230 is connected with the processor 210 to transmit and/or receive a radio signal. The processor 210 implements a function, a process, and/or a method which are proposed. In the aforementioned embodiment, the operation of the base station may be implemented by the processor 210.

UE 100 includes a processor 110, a memory 120, and an RF unit 130. The memory 120 is connected with the processor 110 to store various pieces of information for driving the processor 110. The RF unit 130 is connected with the processor 110 to transmit and/or receive the radio signal. The processor 110 implements a function, a process, and/or a method which are proposed.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for transmitting/receiving a signal in carrier aggregation, the method performed by a User Equipment (UE) and comprising:
   transmitting an uplink signal by using a first uplink carrier and a second uplink carrier including two bands among evolved universal terrestrial radio access (E-UTRA) operating bands 1, 3, 7 and 20;
   receiving a downlink signal by using a first downlink carrier, a second downlink carrier, and a third downlink carrier including three bands among E-UTRA operating bands 1, 3, 5, 7 and 20,
   wherein the first uplink carrier, the second uplink carrier, the first downlink carrier, the second downlink carrier, and the third downlink carrier are configured to be aggregated by the carrier aggregation; and
   determining a maximum sensitivity degradation (MSD) value among a plurality of MSD values based on a center frequency of the first uplink carrier, a center frequency of the second uplink carrier, a center frequency of the third downlink carrier, and a combination of the three bands among the E-UTRA operating bands 1, 3, 5, 7 and 20 and the two bands among the E-UTRA operating bands 1, 3, 7 and 20,
   wherein the reception of the downlink signal by using the third downlink carrier is performed based on a receiving reference sensitivity to which the determined MSD value is applied, and
   wherein the center frequency of the third downlink carrier is related to a combination of the center frequency of the first uplink carrier and the center frequency of the second uplink carrier, such that due to the first uplink carrier and the second uplink carrier being used for uplink transmission, a harmonics component and an intermodulation distortion (IMD) component flowing into at least the third downlink carrier are reduced.

2. The method of claim 1, wherein when the first downlink carrier, the second downlink carrier and the third downlink carrier include the E-UTRA operating bands 1, 5 and 7, the first uplink carrier includes the E-UTRA operating band 1 and the second uplink carrier includes the E-UTRA operating band 7, and when the center frequency of the first uplink carrier is 1,968 MHz, the center frequency of the second uplink carrier is 2,512 MHz, and the center frequency of the third downlink carrier, which includes the E-UTRA operating band 5, is 880 MHz, the MSD value is determined to be 0.22 dB or 0 dB.

3. The method of claim 2, wherein when the number of resource blocks (RBs) of the first uplink carrier is 25 and the number of RBs of the second uplink carrier is 50, the MSD value in a third downlink band is determined to be 0.22 dB or 0 dB.

4. The method of claim 1, wherein when the first downlink carrier, the second downlink carrier and the third downlink carrier include the E-UTRA operating bands 3, 7 and 20, the first uplink carrier includes the E-UTRA operating band 3, the second uplink carrier includes the E-UTRA operating band 7, and when the center frequency of the first uplink carrier is 1,737 MHz, the center frequency of the second uplink carrier corresponds to 2,543 MHz, and the center frequency of the third downlink carrier, which includes the E-UTRA operating band 20, is 806 MHz, the MSD value is determined to be 22 dB.

5. The method of claim 4, wherein when the number of resource blocks (RBs) of the first uplink carrier is 25 and the number of RBs of the second uplink carrier is 50, the MSD value in a third downlink band is determined to be 22 dB.

6. The method of claim 1, wherein when the first downlink carrier, the second downlink carrier and the third downlink carrier include the E-UTRA operating bands 3, 7 and 20, the first uplink carrier includes the E-UTRA operating band 3 and the second uplink carrier includes the E-UTRA operating band 20, and when the center frequency of the first uplink carrier is 1,775 MHz, the center frequency of the second uplink carrier is 885 MHz and the center frequency of the third downlink carrier, which includes the E-UTRA operating band 7 is 2,630 MHz, the MSD value is determined to be 23 dB.

7. The method of claim 6, wherein when the number of resource blocks (RBs) of the first uplink carrier is 50 and the number of RBs of the second uplink carrier is 25, the MSD value in a third downlink band is determined to be 23 dB.

8. A wireless device for transmitting/receiving a signal in carrier aggregation, the wireless device comprising:
a transceiver; and
a processor operatively connected to the transceiver, wherein the processor is configured to:
control the transceiver to transmit an uplink signal by using a first uplink carrier and a second uplink carrier including two bands among evolved universal terrestrial radio access (E-UTRA) operating bands 1, 3, 7 and 20;
control the transceiver to receive a downlink signal by using a first downlink carrier, a second downlink carrier, and a third downlink carrier including three bands among E-UTRA operating bands 1, 3, 5, 7 and 20,
wherein the first uplink carrier, the second uplink carrier, the first downlink carrier, the second downlink carrier, and the third downlink carrier are configured to be aggregated by the carrier aggregation; and
determine a maximum sensitivity degradation (MSD) value among a plurality of MSD values based on a center frequency of the first uplink carrier, a center frequency of the second uplink carrier, a center frequency of the third downlink carrier, and a combination of the three bands among the E-UTRA operating bands 1, 3, 5, 7 and 20 and the two bands among the E-UTRA operating bands 1, 3, 7 and 20,
wherein the reception of the downlink signal by using the third downlink carrier is performed based on a receiving reference sensitivity to which the determined MSD value is applied, and
wherein the center frequency of the third downlink carrier is related to a combination of the center frequency of the first uplink carrier and the center frequency of the second uplink carrier, such that due to the first uplink carrier and the second uplink carrier being used for uplink transmission, a harmonics component and an intermodulation distortion (IMD) component flowing into at least the third downlink carrier are reduced.

9. The wireless device of claim 8, wherein when the first downlink carrier, the second downlink carrier and the third downlink carrier include E-UTRA operating bands 1, 5 and 7, the first uplink carrier includes the E-UTRA operating band 1 and the second uplink carrier includes the E-UTRA operating band 7, and when the center frequency of the first uplink carrier is 1,968 MHz, the center frequency of the second uplink carrier is 2,512 MHz, and the center frequency of the third downlink carrier, which includes the E-UTRA operating band 5, is 880 MHz, the MSD value is determined to be 0.22 dB or 0 dB.

10. The wireless device of claim 9, wherein when the number of resource blocks (RBs) of the first uplink carrier is 25 and the number of RBs of the second uplink carrier is 50, the MSD value in a third downlink band is determined to be 0.22 dB or 0 dB.

11. The wireless device of claim 8, wherein when the first downlink carrier, the second downlink carrier and the third downlink carrier include the E-UTRA operating bands 3, 7 and 20, the first uplink carrier includes the E-UTRA operating band 3, the second uplink carrier includes the E-UTRA operating band 7, and when the center frequency of the first uplink carrier is 1,737 MHz, the center frequency of the second uplink carrier corresponds to 2,543 MHz, and the center frequency of the third downlink carrier, which includes the E-UTRA operating band 20, is 806 MHz, the MSD value is determined to be 22 dB.

12. The wireless device of claim 11, wherein when the number of resource blocks (RBs) of the first uplink carrier is 25 and the number of RBs of the second uplink carrier is 50, the MSD value in a third downlink band is determined to be 22 dB.

13. The wireless device of claim 8, wherein when the first downlink carrier, the second downlink carrier and the third downlink carrier include the E-UTRA operating bands 3, 7 and 20, the first uplink carrier includes the E-UTRA operating band 3 and the second uplink carrier includes the E-UTRA operating band 20, and when the center frequency of the first uplink carrier is 1,775 MHz, the center frequency of the second uplink carrier is 885 MHz and the center frequency of the third downlink carrier, which includes the E-UTRA operating band 7 is 2,630 MHz, the MSD value is determined to be 23 dB.

14. The wireless device of claim 13, wherein when the number of resource blocks (RBs) of the first uplink carrier is 50 and the number of RBs of the second uplink carrier is 25, the MSD value in a third downlink band is determined to be 23 dB.

* * * * *